United States Patent [19]

Cornelius

[11] Patent Number: 5,383,672

[45] Date of Patent: Jan. 24, 1995

[54] SEAL STRUCTURE FOR ROTARY KILN

[75] Inventor: Jack M. Cornelius, Leeds, Ala.

[73] Assignee: PE Flo-Tech, Inc., Birmingham, Ala.

[21] Appl. No.: 936,306

[22] Filed: Aug. 28, 1992

[51] Int. Cl.$^6$ .................................................. F16J 15/32
[52] U.S. Cl. .................................. 277/152; 277/159;
277/189; 403/337; 432/115
[58] Field of Search ............... 277/1, 9, 9.5, 35, 47,
277/101, 126, 152, 159, 188 R, 189, 192;
432/115; 403/258, 337; 411/155, 169, 537, 546

[56] References Cited

U.S. PATENT DOCUMENTS

| | | | |
|---|---|---|---|
| 2,653,834 | 9/1953 | Purkhiser | 403/337 |
| 3,724,887 | 4/1973 | Roberts | 432/115 |
| 3,733,575 | 5/1973 | Gottschalk | 411/537 |
| 4,111,439 | 9/1978 | Schmidt | 432/115 |
| 4,342,555 | 8/1982 | Bohansky | 432/115 |
| 4,370,128 | 1/1983 | Chielens et al. | 432/115 |
| 4,405,137 | 9/1983 | Webb | 432/115 |
| 4,406,464 | 9/1983 | Schymura | 432/115 |
| 4,635,332 | 1/1987 | Cederwall et al. | 277/9.5 |
| 4,961,588 | 10/1990 | Brienza | 277/189 |

Primary Examiner—Daniel G. DePumpo
Attorney, Agent, or Firm—Veal & Marsh

[57] ABSTRACT

An improved sealing structure for a rotary kiln utilized a leaf riding band attached to a truing flange on the kiln's rotating hopper using a plurality of clamps connected to a radial flange on the leaf riding band. The clamps hold the truing flange and radial in abutting sealing relationship without the need for bolts passing through the truing ring.

6 Claims, 2 Drawing Sheets

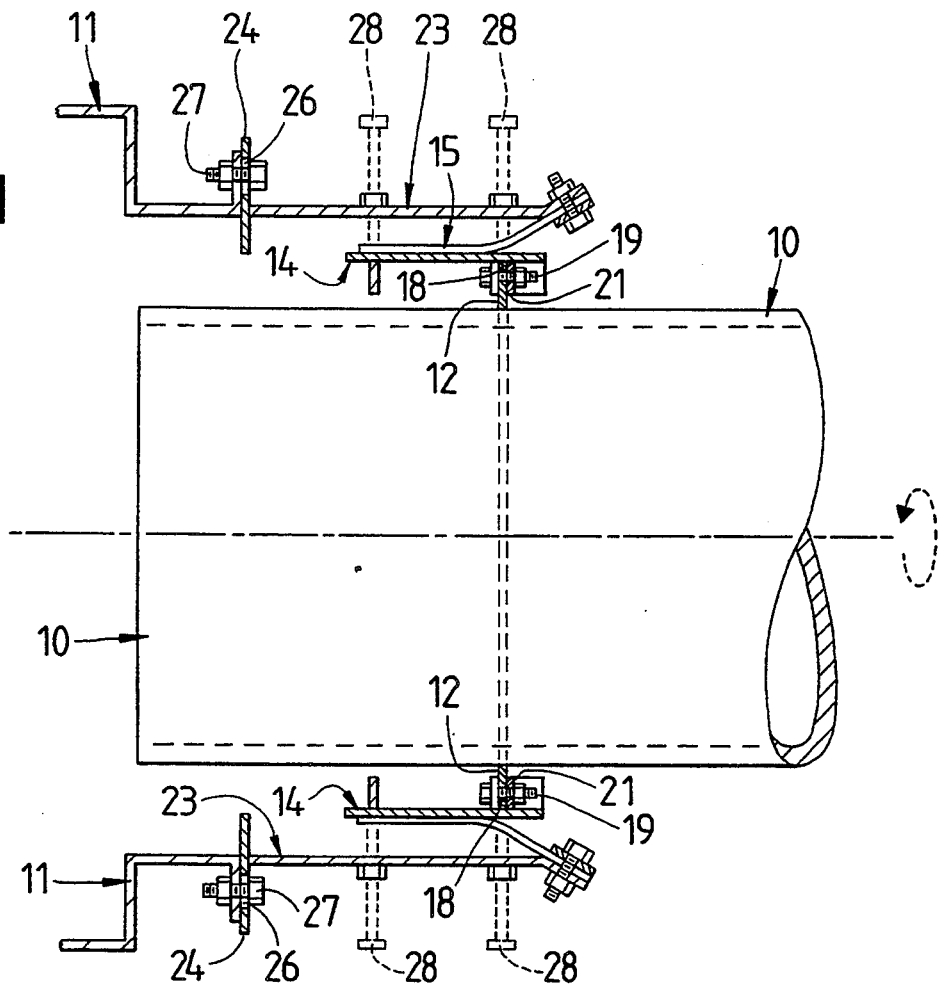
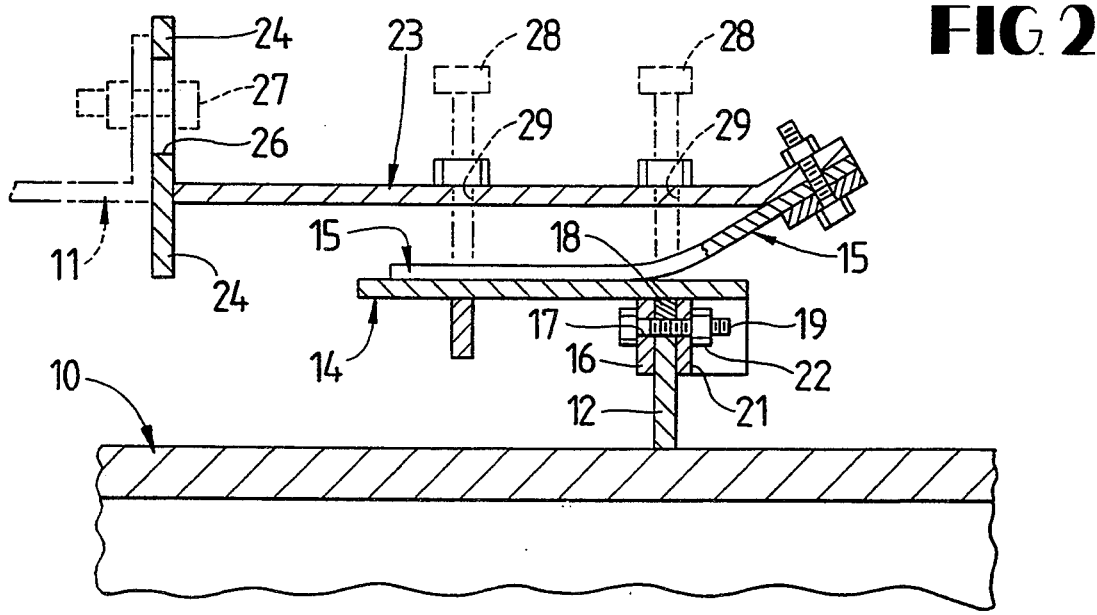

SEAL STRUCTURE FOR ROTARY KILN

FIELD OF THE INVENTION

The present invention relates generally to the field of kilns and more particularly to rotating kilns which rotate about a horizontal axis. More particularly the invention relates to the devices used in providing a gaseous seal about the end of a kiln wherein the material to be processed is input or removed. In greater particularity the present invention relates to a method and apparatus for securing a leaf seal band to a truing flange and mounting the seals for minimal dynamic deflection.

BACKGROUND OF THE INVENTION

U.S. Pat. No. 4,961,588 describes the prior art sealing means employed to provide a seal between a windbox and a rotating cylinderlot hopper of a rotary kiln. The 4,961,588 patent also discloses the use of a plurality of finger-like members to cooperatively yield a radial seal. As related in that patent such a plurality of fingers is said to provide a seal in instances wherein the cylinder is eccentric. In actual practice, while the sealing fingers are an improvement, they do not seal appropriately when an out of round cylinder is encountered. This is a significant problem in as much as out of round cylinders are the norm rather than the exception in as much as the heat and loading applied to the cylinders normally cause the overhung end of the cylinder to assume an eccentric shape relative to the axis of rotation of the cylinder. Applicant's business concerns maintenance and repair of such devices and considerable experimentation has been undertaken to restore an eccentric cylinder to a satisfactory sealing condition.

One prior attempt was to use a truing ring with a pseudo surface welded to the outer periphery thereof, the truing ring being concentric with the axis of rotation. This effort led to excessive cost due to the necessity of welding the pseudo-cylinder surface to the truing ring at the kiln site. Further thermal expansion of and contraction of the ring and pseudo cylinder surface resulted in failure of the welds. Accordingly, it is necessary to find a way to present the sealing fingers with a relatively uniform surface to minimize dynamic deflection of the fingers.

SUMMARY OF THE INVENTION

It is an object of the present invention to provide a superior radial seal between a windbox and a rotating cylinder of a rotary kiln.

In the furtherance of the principal object, it is the object of the present invention to provide a substantially concentric rotating surface about the rotating cylinder such that deflection of the sealing members is minimized.

Yet another object of the present invention is to provide a method and construction of such a sealing surface that will permit efficient and effective on-site repair and restoration of the sealing junction about such rotary kiln cylinders.

These and other objects and advantages are accomplished in my invention through the use of a novel means of attaching an annular band about an eccentric cylinder to provide a sealing surface which is concentric with the axis of rotation of the cylinder. By doing so I greatly reduce the amount of on-site welding as well as the time and labor involved. Consequently, my invention diminishes the deleterious effects of thermal expansion on welded joints. In essence the seal riding ring of the invention is attached by a bolt-type clamp, however the bolt does not pass through a truing ring attached to the cylinder. I further provide a set of alignment bolts to align the radial seal elements with the surface to also minimize deflection.

BRIEF DESCRIPTION OF THE DRAWINGS

Apparatus embodying features of my invention are depicted in the accompanying drawings which form a portion of this disclosure and wherein:

FIG. 1 is a partial side elevational view of the kiln hopper and sealing structure;

FIG. 2 is a detail sectional view of the seal structure;

DESCRIPTION OF A PREFERRED EMBODIMENT

Figure 3:
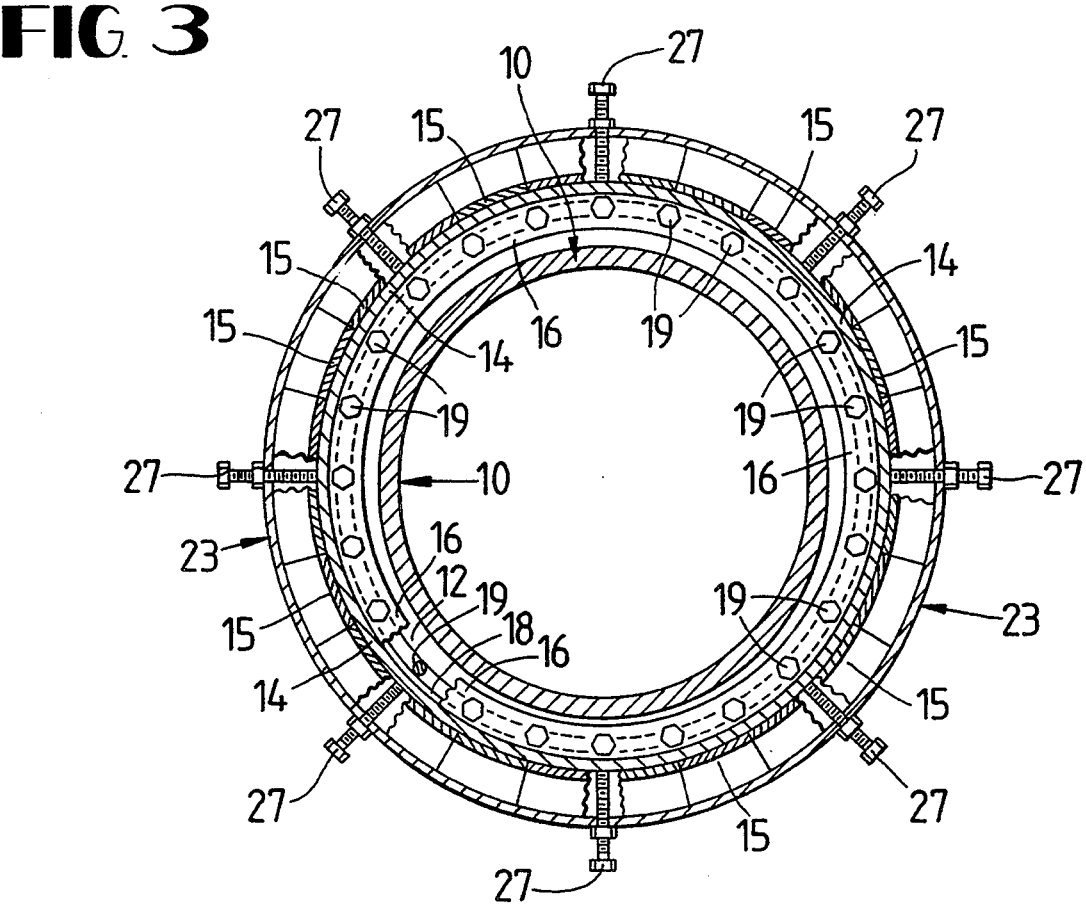
FIG. 3 is a sectional view taken along line 3—3 of FIG. 1.
Figure 4:
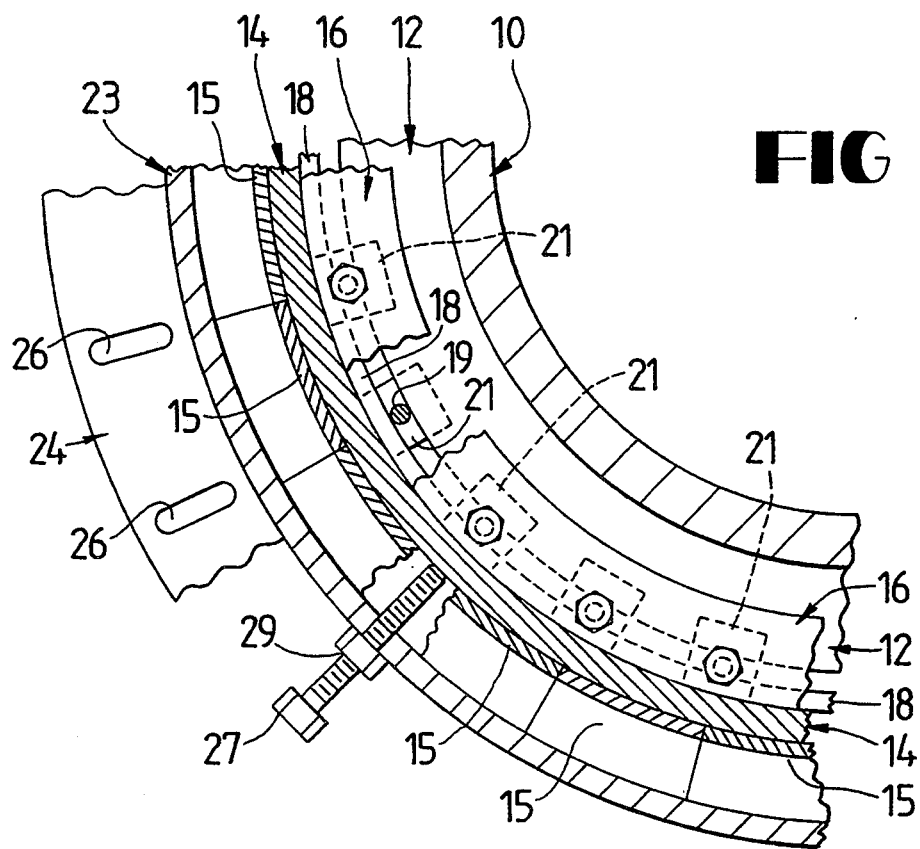
FIG. 4 is a partial view of FIG. 3 in greater detail.

Referring to the drawings for a clearer understanding of the invention, it may be seen in FIG. 1 that a generally cylindrical hopper 10 is mounted for rotation about a horizontal axis, as is well known in the art, and extends within a windbox 11 also as well known in the art. As noted herein above the hopper 10 becomes deformed, as shown in FIG. 3. Although U.S. Pat. No. 4,961,588 asserted that the seals therein would accommodate such distortion, nonetheless, it has been necessary to add a truing flange 12, which is welded to the outer surface of the hopper 10 and which has defined thereon an outer circumference which is concentric with the axis of rotation of the hopper. Mounted to the truing flange 12 is an annular band or leaf riding band 14 which is also concentric with the axis of rotation. Sealing leaves 15 such as shown in U.S. Pat. No. 4,961,588 rest on the leaf riding band 14 to create a radial seal. It is the connection of the band to the flange that presents the greatest difficulty in reworking rotary kilns. Due to the obvious space limitations, welding the band to the flange is impractical and subject to failure. Bolting the band to the flange by passing the bolts through the flange has been accomplished but requires the exact formation of bolt holes in the flange after it has been affixed to the hopper, which is exceedingly difficult and time-consuming. Accordingly, neither of these approaches are used in the instant invention.

In the present invention a radial flange 16 is affixed to the inside of the band 14 to extend toward the hopper 10. The band 14 has an inner diameter greater than the truing flange 12 and the radial flange 16 extends radially sufficiently to overlap the truing flange when the flange and flange are placed in axial abutment. The band 14 and associated flange 16 may be manipulated much easier than the hopper 10 and truing flange 12, thus once the band has been appropriately sized, the flange 16 has formed therein a plurality of holes 17 on a radius which would circumscribe the outer end of the truing flange. Welded to the flange 16 and the band 14 at the junction thereof is a spacer 18 which has a width no greater than the axial width of the truing flange 12. Thus the holes 17 in the flange 16 are formed intermediate the spacer 18 and the outer edge of the truing flange 12. A bolt 19 passes through each hole and through a clamp member 21 to threadably engage a nut 22. The clamp member 21 may be in the form of an L-clamp such that it extends radially from the inner surface of the leaf riding band in overlapping relation with the truing flange 12 and axially along the inner surface of the band 14. As the nut and bolt are tightened the flange 16 and clamp member 21 capture the truing flange 12 and spacer 18 therebetween. A plurality of bolts 19 and clamps 21 are utilized about the periphery of the truing flange to mate the band and radial flange 16 thereto, thus by the mutual interaction of the bolts and clamps, securing the radial flange 16 against the flange in an abutting sealing relationship. Note that the bolts may be non-rotatably affixed within the holes 17 such that only the nuts 22 need be manipulated to tighten the connection between the components, thereby greatly simplifying and facilitating the connection of the band to the flange and hopper. It will be appreciated that this form of attachment allows the worker to form the holes in a piece which is easily manageable and in fact in a radial flange which may be manufactured with the holes tapped or bolts affixed for shipment to the kiln site, thereby greatly improving the manufacturing efficiency.

To further improve the seal quality, the sealing leaves 15 should undergo minimum dynamic deflection, thus a seal leaf support ring 23 which carries the leaves 15 should be concentric with the leaf riding band 14. To ensure concentricity, the leaf support ring 23 is fabricated with a mounting flange 24 which has a plurality of mounting slots 26 extending radially from the center of the ring through which mounting bolts or fasteners 27 may engage the windbox, thus the support ring 23 can be radially positioned. Proper radial positioning is accomplished using a plurality of adjustable bolts 28 which are threadably engaged in apertures 29 in the support ring itself at selected angular locations. Bolts 28 may be advanced and retracted during the mounting of the support ring 23 such that each bolt contacts the leaf riding band 14 at an equal distance from the seal support ring. The seal support ring 23 is then affixed to the windbox 11 and the adjustable bolts 28 are retracted. The threaded apertures 29 are plugged and the seal leaves 15 affixed to the leaf support ring 23 to rest on the seal riding band 14. In this manner, a superior radial seal may be formed even for an eccentric kiln hopper.

While I have shown my invention in one form, it will be obvious to those skilled in the art that it is not so limited but is susceptible of various changes and modifications without departing from the spirit thereof.

What I claim is:

1. In a rotary kiln utilizing a rotary cylinder or hopper with thermally induced eccentricity which rotates about a horizontal axis and a plurality of flexible sealing leaves mounted about said hopper to define an annular seal about one end thereof, the inprovement comprising of:
   (a) a solid truing flange formed on said hopper and extending radially outwardly therefrom in accordance with said thermally induced eccentricity in said hopper to provide said truing flange with a circumference concentric with said horizontal axis;
   (b) a leaf riding band forming an annular ring about said truing flange having a circumference concentric with said horizontal axis;
   (c) and means for attaching said leaf riding band to said truing flange without penetrating said truing flange, wherein said means for attaching comprises a radial flange affixed to said leaf riding band and extending radially inward therefrom parallel to said truing flange such that said radial and truing flanges abut axially relative to said hopper, with said radial flange having a plurality of apertures defined therein and clamping means for securing said truing flange and radial flange in axial abutment.

2. The rotary kiln as defined in claim 1 wherein said clamping means comprises at least one fastener extending through at least one aperture of said plurality of apertures and engaging a clamp member to draw said clamp member into axial abutment with said truing flange such that said truing flange is captured between said radial flange and said clamp member.

3. The rotary kiln as defined in claim 2 wherein said fastener is a threaded member which passes through an aperture in said clamp member, said clamp member being of sufficient size as to abut said leaf riding band when engaged with said truing flange.

4. The rotary kiln as defined in claim 3 further comprising a spacer fixed in abutting relationship to said radial flange and said leaf riding band radially outwardly of said truing flange and having an axial dimension not greater than the axial thickness of said truing flange.

5. In a rotary kiln utilizing a rotary cylinder or hopper with thermally induced eccentricity which rotates about a horizontal axis and a plurality of flexible sealing leaves mounted about said hopper to define an annular seal about one end thereof, the improvements comprising of:
   (a) a solid truing flange formed on said hopper and extending radially outwardly therefrom in accordance with said thermally induced eccentricity in said hopper to provide said truing flange with a circumference concentric with said horizontal axis;
   (b) a leaf riding band forming an annular ring about said truing flange having a circumference concentric with said horizontal axis;
   (c) and means for attaching said leaf riding band to said truing flange without penetrating said truing flange;
   (d) and means for positioning said sealing leaves concentrically about said leaf riding band, wherein said means for positioning comprises a leaf support ring adapted to carry said sealing leaves in an annular array with said sealing leaves extending within said ring, said ring being circular and fitted for mounting to said kiln concentrically with said leaf riding band and a plurality of threaded members adjustably and removably engaged within threaded apertures in said leaf support ring such that each threaded member can be adjusted to contact said leaf riding band while extending within said leaf support ring a distance equal to each other threaded member in said leaf supporting band.

6. An improvement in a rotary kiln wherein the kiln includes a cylinder or hopper with thermally induced eccentricity and means for rotating said hopper about a horizontal axis, said hopper being generally cylindrical about said horizontal axis and defining an opening at one end thereof, the improvement comprising;
   (a) a truing flange fixedly attached to and circumscribing said hopper proximal said opening in accordance with thermally induced eccentricity in said hopper, said truing flange having an edge at its outer diameter concentric with said horizontal axis; a leaf riding band spaced from said edge and concentric therewith; a radial flange extending radially inwardly of said leaf riding band, parallel to said truing flange and having a plurality of angular spaced apertures therethrough; a clamping member having an aperture therethrough, a spacer affixed to said band and radial flange at the junction thereof; and threaded connector means extending through said apertures in said radial flange and said clamping member for urging said radial flange and clamp against opposing sides of said truing flange and spacer; and (b) a ring for supporting a plurality of sealing leaves which circumscribe said leaf riding band to form an air seal therewith, said ring including a plurality of removable adjusting bolts extending radially therethrough to engage said leaf riding band to position said ring concentrically about said band and thus reduce flexion of said leaves.

* * * * *